US008999598B2

(12) United States Patent
Yoon et al.

(10) Patent No.: US 8,999,598 B2
(45) Date of Patent: Apr. 7, 2015

(54) MOLTEN CARBONATE FUEL CELLS INCLUDING REINFORCED LITHIUM ALUMINATE MATRIX, METHOD FOR PREPARING THE SAME, AND METHOD FOR SUPPLYING LITHIUM SOURCE

(75) Inventors: Sung Pil Yoon, Seongnam-si (KR); In Hwan Oh, Seoul (KR); Jong Hee Han, Seoul (KR); Suk Woo Nam, Seoul (KR); Seong Cheol Jang, Seoul (KR); Shin Ae Song, Seoul (KR); Tae Won Lee, Yuseong-gu (KR); In Gab Chang, Yuseong-gu (KR); Bo Hyun Ryu, Yuseong-gu (KR)

(73) Assignee: Korea Institute of Science & Technology, Seoul (KR)

( * ) Notice: Subject to any disclaimer, the term of this patent is extended or adjusted under 35 U.S.C. 154(b) by 538 days.

(21) Appl. No.: 13/353,073

(22) Filed: Jan. 18, 2012

(65) Prior Publication Data
US 2012/0196204 A1 Aug. 2, 2012

(30) Foreign Application Priority Data
Jan. 31, 2011 (KR) ........................ 10-2011-0009575

(51) Int. Cl.
*H01M 8/14* (2006.01)
*H01M 8/02* (2006.01)

(52) U.S. Cl.
CPC ............ *H01M 8/142* (2013.01); *H01M 8/0295* (2013.01); *H01M 2008/147* (2013.01); *Y02E 60/526* (2013.01)

(58) Field of Classification Search
None
See application file for complete search history.

(56) References Cited

U.S. PATENT DOCUMENTS

| 5,869,203 A * | 2/1999 | Huang et al. .................. 429/475 |
| 5,983,488 A * | 11/1999 | Erickson et al. ................ 29/731 |
| 8,557,468 B2 * | 10/2013 | Hilmi et al. .................... 429/478 |
| 2006/0257722 A1 * | 11/2006 | Hilmi et al. ..................... 429/46 |
| 2006/0269830 A1 * | 11/2006 | Johnsen et al. ................. 429/46 |

FOREIGN PATENT DOCUMENTS

| JP | 06-188012 A | 7/1994 |
| JP | 07-161367 A | 6/1995 |
| KR | 10-2006-0099636 A | 9/2006 |
| KR | 10-2008-0016858 A | 2/2008 |

\* cited by examiner

*Primary Examiner* — Patrick Ryan
*Assistant Examiner* — Lucas J O Donnell
(74) *Attorney, Agent, or Firm* — Merchant & Gould P.C.

(57) ABSTRACT

Disclosed is a molten carbonate fuel cell comprising a reinforced lithium aluminate matrix, a cathode, an anode, a cathode frame channel and an anode frame channel, wherein at least one of the cathode frame channel and the anode frame channel is filled with a lithium source. Disclosed also are a method for producing the same, and a method for supplying a lithium source. The molten carbonate fuel cell in which a lithium source is supplied to an electrode has high mechanical strength and maintains stability of electrolyte to allow long-term operation.

7 Claims, 8 Drawing Sheets

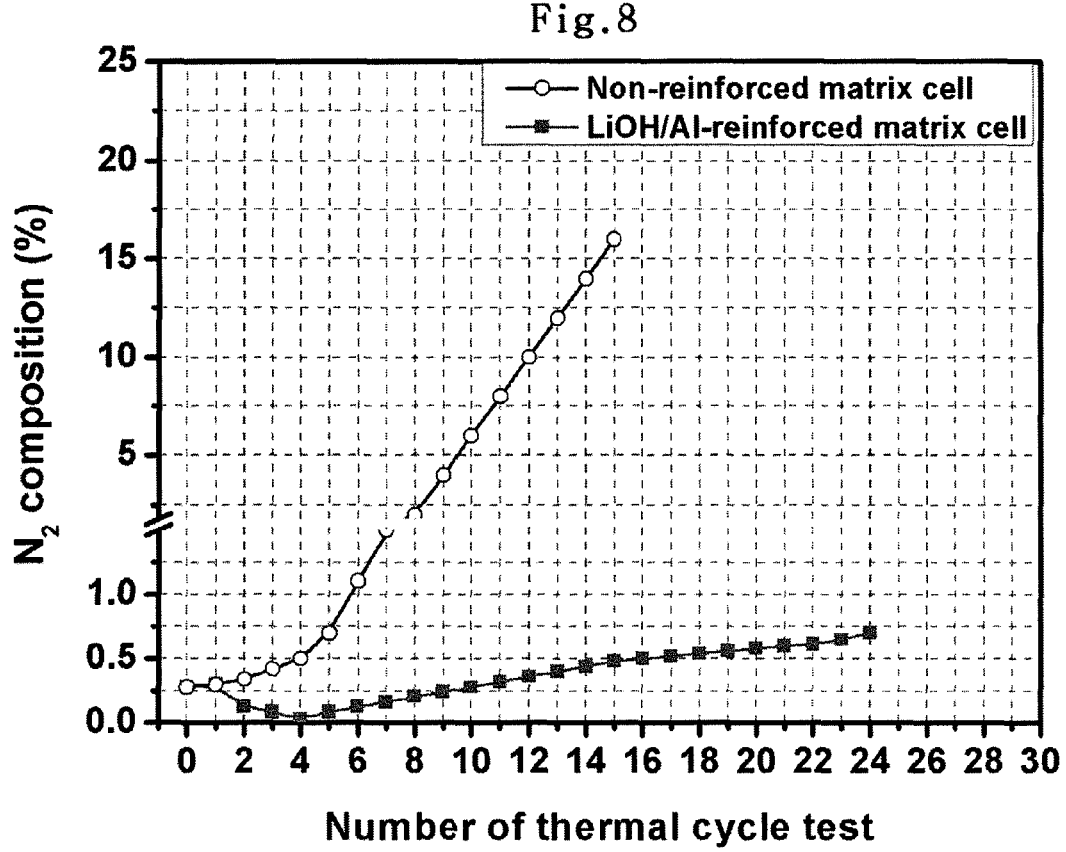

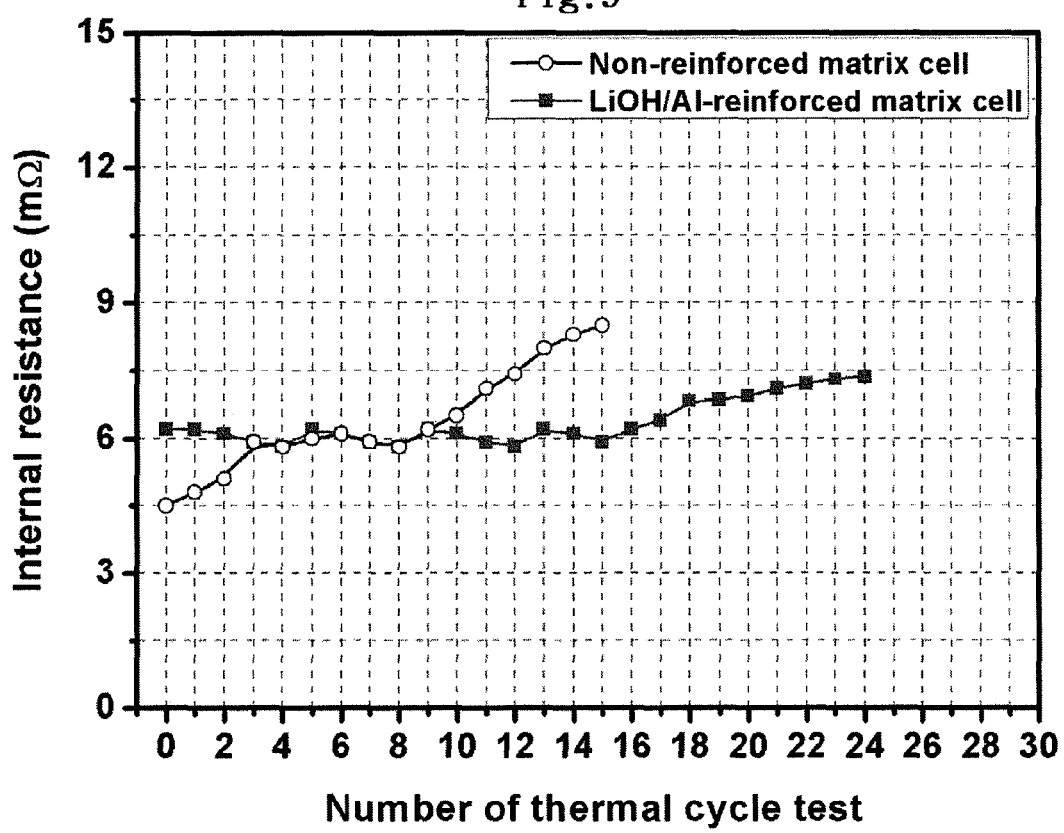

MOLTEN CARBONATE FUEL CELLS INCLUDING REINFORCED LITHIUM ALUMINATE MATRIX, METHOD FOR PREPARING THE SAME, AND METHOD FOR SUPPLYING LITHIUM SOURCE

CROSS-REFERENCE TO RELATED APPLICATION

This application claims priority to Korean Patent Application No. 10-2011-0009575, filed on Jan. 31, 2011, and all the benefits accruing therefrom under 35 U.S.C. §119, the contents of which in its entirety are herein incorporated by reference.

BACKGROUND

1. Field

The present disclosure relates to a molten carbonate fuel cell including a reinforced lithium aluminate matrix, a method for producing the same, and a method for supplying a lithium source.

2. Description of the Related Art

In general, a fuel cell is a device by which chemical energy of chemical fuel is converted directly into electric energy. Such fuel cells have high efficiency, and show eco-friendly characteristics. Among such fuel cells, a molten carbonate fuel cell (also referred to as MCFC hereinafter) operating at high temperature is driven at a high temperature of 650° C., and thus has advantages that are not provided by low-temperature type fuel cells, such as phosphate type or polymer fuel cells. An MCFC includes: a cathode where oxygen, carbon dioxide and electrons join to form a carbonate ion; an anode where hydrogen is oxidized to generate an electron and is allowed to react with carbonate ion to form water; an electrolyte that facilitates movement of carbonate ion; and a matrix on which the electrolyte is supported at high temperature. Particularly, the matrix serves to support and fix a flowable liquid electrolyte and has a porous microstructure.

Since $LiAlO_2$ has high wettability with molten carbonate, it is widely used as a matrix for MCFCs. However, poor mechanical strength of a $LiAlO_2$ matrix causes the matrix to be broken when an MCFC is driven for a long time. Since the mechanical strength of a $LiAlO_2$ matrix significantly affects the operation of an MCFC, many studies have been conducted about reinforced matrices. Recently, some studies have been disclosed about the reinforcement of a matrix, including adding rod-shaped particles, alumina fibers, a crack attenuator and coarse alumina particles. When reinforcing a matrix with alumina fibers, it is not possible to obtain desired cost-efficiency and sufficient mechanical strength. To accomplish commercialization of MCFCs, one of the most important factors is ensuring high cost-efficiency. Therefore, it is important to develop a matrix reinforcing material having high cost efficiency and high reinforcing capability. Aluminum particles are cheap and function also as a crack attenuator, and thus are suitable as a matrix reinforcing material. However, aluminum particles are problematic in that they may react with lithium ions in electrolyte to produce $LiAlO_2$ (see, the following Reaction Formula 1). Such consumption of lithium ions causes a change in composition of electrolyte and affects stability, conductivity, etc., thereby adversely affecting the life of an MCFC.

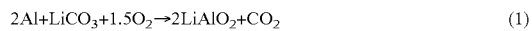

$$2Al + LiCO_3 + 1.5O_2 \rightarrow 2LiAlO_2 + CO_2 \quad (1)$$

According to the related art, a reinforced matrix has been developed by adding aluminum particles (3 μm, 30 wt %) thereto. Herein, to compensate for the consumed lithium, $Li_2CO_3$ is also added to the matrix. However, $Li_2CO_3$ particles cause formation of large pores, resulting in cracking in the matrix during the operation of an MCFC and an increase in cross-over of reactant gas through the resultant cracks.

SUMMARY

The present disclosure is directed to providing a molten carbonate fuel cell including a reinforced lithium aluminate matrix having high mechanical strength and maintaining stability of electrolyte to allow long-term operation by supplying a lithium source to an electrode. The present disclosure is also directed to providing a method for producing the above-mentioned molten carbonate fuel cell, and a method for supplying a lithium source.

In one aspect, there is provided a molten carbonate fuel cell comprising a reinforced lithium aluminate matrix, a cathode, an anode, a cathode frame channel and an anode frame channel, wherein at least one of the cathode frame channel and the anode frame channel is filled with a lithium source.

According to one embodiment, the reinforced lithium aluminate matrix may be reinforced with aluminum particles incorporated thereto.

According to another embodiment, the lithium source may have a melting point of 200 to 500° C. The lithium source may include lithium hydroxide (LiOH), lithium nitrate ($LiNO_3$) and lithium iodide (LiI).

In another aspect, there is provided a method for producing a molten carbonate fuel cell comprising a reinforced lithium aluminate matrix, a cathode, an anode, a cathode frame channel and an anode frame channel, the method including: supplying a lithium source to at least one of the cathode frame channel and the anode frame channel.

In still another aspect, there is provided a method for supplying a lithium source to a molten carbonate fuel cell comprising a reinforced lithium aluminate matrix, a cathode, an anode, a cathode frame channel and an anode frame channel, the method including: supplying a lithium source to at least one of the cathode frame channel and the anode frame channel to allow the lithium source to reach the matrix.

BRIEF DESCRIPTION OF THE DRAWINGS

The above and other aspects, features and advantages of the disclosed exemplary embodiments will be more apparent from the following detailed description taken in conjunction with the accompanying drawings in which:

FIG. 8 is a graph showing the $N_2$ cross-over in a thermal cycle test of a molten carbonate fuel cell according to an embodiment; and FIG. 9 is a graph showing the internal resistance (IR) values in a thermal cycle test of a molten carbonate fuel cell according to an embodiment.

DETAILED DESCRIPTION

Figure 1:
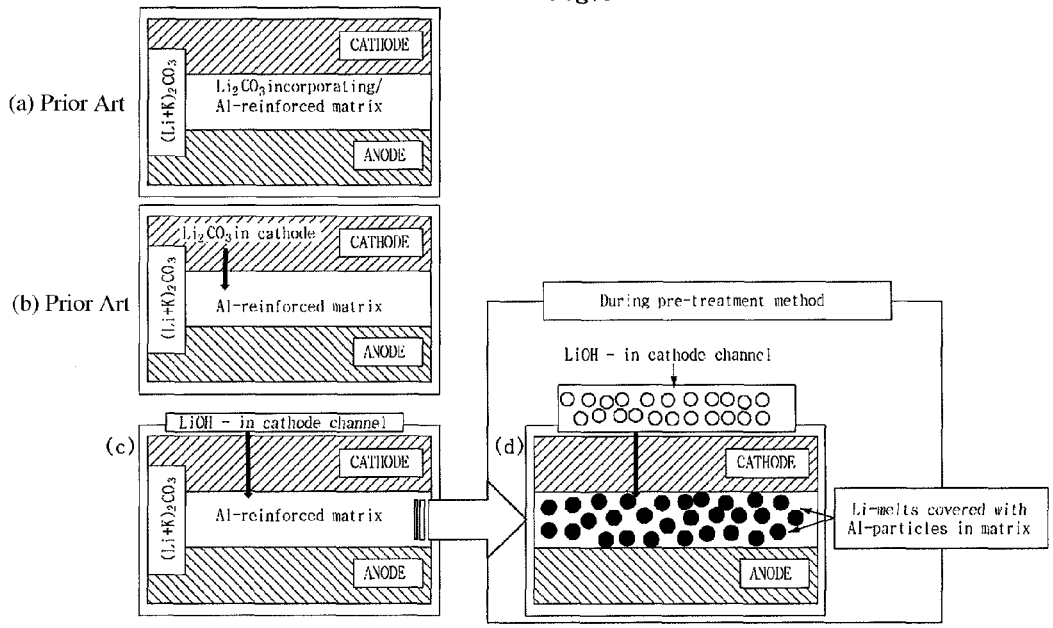
FIG. 1 is a schematic view illustrating a method for supplying a lithium source to an aluminum-reinforced matrix in the method for producing a molten carbonate fuel cell according to an embodiment (portion (a) represents Comparative Example 1, portion (b) represents Comparative Example 2 and portion (c) represents Example 1)

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

In one aspect, there is provided a molten carbonate fuel cell comprising a reinforced lithium aluminate matrix, a cathode, an anode, a cathode frame channel and an anode frame channel, wherein at least one of the cathode frame channel and the anode frame channel is filled with a lithium source.

The reinforced lithium aluminate matrix may be reinforced with aluminum particles incorporated thereto, but is not limited thereto. Other methods for reinforcing a matrix include adding rod-shaped particles, alumina fibers, crack attenuators and coarse alumina particles.

The lithium source may have a melting point of 200 to 500° C.

Particular examples of the lithium source that may be used herein include lithium hydroxide (LiOH), lithium nitrate ($LiNO_3$) and lithium iodide (LiI), more particularly lithium hydroxide (LiOH). However, any lithium sources may be used with no particular limitation, as long as they have the above-defined melting point range and are capable of supplying lithium source.

The lithium source has a melting point lower than the melting point of an electrolyte, 500° C. In general, electrolytes have a melting point of 480 to 500° C. Such a melting point range is intended to allow lithium to move easily through the gaps between the pores of a cathode after organic substances are burned out during the pretreatment of a matrix (such organic substances are totally burned out at a temperature of 400° C. or lower), so that lithium is allowed to react with aluminum particles in the matrix before the electrolyte melts. Lithium nitrate has a melting point of 255° C., lithium iodide has a melting point of 469° C. and lithium hydroxide has a melting point of 467° C., and thus they may be suitable as electrolytes. Particularly, lithium hydroxide reacts with aluminum particles in a matrix as depicted in the following Reaction Formula 2 to produce $LiAlO_2$. No large pores are formed according to Reaction Formula 2.

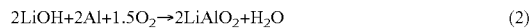

$$2LiOH+2Al+1.5O_2 \rightarrow 2LiAlO_2+H_2O \quad (2)$$

When the lithium source has a melting point lower than 200° C., plasticizers, binders, or the like, remaining in the pores of a matrix obtained by tape casting are not removed. Therefore, such a lithium source having a melting point lower than 200° C. shows low accessibility to aluminum, thereby making it difficult to induce a reaction between aluminum particles and the lithium source.

When a frame channel in either or both of a cathode and an anode is filled with a lithium source, the lithium source passes through the electrode materials and reaches the matrix. Portion (c) of FIG. 1 illustrates supplying a lithium source only to the upper electrode, cathode. As can be seen from portion (c) of FIG. 1, when the frame channel of the upper electrode is filled with a lithium source, the lithium source is capable of moving toward the matrix through the gravity, diffusion, etc. In addition, when the frame channel of a lower electrode is filled with a lithium source, the lithium source is capable of moving toward the matrix through diffusion, etc. As used herein, the expressions 'upper electrode' and 'lower electrode' are based on the position of each electrode depending on the location of the cell, regardless of the type of the electrode, i.e., cathode or anode.

As can be seen from portion (d) of FIG. 1, a porous structure is formed after organic additives are burned out during the pretreatment, so that a lithium compound easily passes through the electrode. Then, lithium that passes through the electrode and reaches the matrix surrounds aluminum particles. Since such coating of aluminum particles with lithium should occur before the electrolyte melts, it is required for lithium to melt before the temperature reaches about 500° C. (melting point of electrolyte) so that aluminum may be coated with lithium. Therefore, it is required that the lithium compound used as a lithium source has a melting point lower than the melting point of electrolyte which is about 500° C.

When a lithium source has a melting point higher than the above-defined range, the lithium source melts in the electrolyte present already in a molten liquid state at a cell operation temperature (about 650° C.), even if it melts and moves toward the matrix. Thus, lithium hardly contacts directly with aluminum particles and participates in the reaction with aluminum. As a result, there is no sufficient reaction between aluminum particles and the lithium source, thereby adversely affecting the stability of a fuel cell. In addition, when a lithium source has a melting point higher than the cell operation temperature, it doesn't melt during the operation of the cell, so that it cannot move toward the matrix. As a result, it is not possible to supply the lithium source to aluminum particles.

On the contrary, when a lithium source has a melting point within the above-defined range, lithium that reaches the matrix in a liquid state at the cell operation temperature surrounds aluminum particles easily, and allows lithiation. The lithium-coated aluminum particles produce lithiated aluminum via the above Reaction Formula 2. In this case, any change in electrolyte composition does not occur during the cell operation. Thus, there is no change in the microstructure of the matrix.

The molten carbonate fuel cell disclosed herein may be obtained by a method for producing a molten carbonate fuel cell including: supplying a lithium source to at least one of a cathode frame channel and an anode frame channel. The same as described in the above paragraphs about the reinforced lithium aluminate matrix and the lithium source is also applied herein.

The molten carbonate fuel cell disclosed herein may be provided as a finished product in which at least one of a cathode frame channel and an anode frame channel is filled with a lithium source.

In another aspect, there is provided a method for supplying a lithium source to a molten carbonate fuel cell, the method including: supplying a lithium source to at least one of a cathode frame channel and an anode frame channel of a molten carbonate fuel cell including a reinforced lithium aluminate matrix so that the lithium source reaches the matrix. Therefore, the method disclosed herein enables in-situ supply of lithium, when a molten carbonate fuel cell including a reinforced lithium aluminate matrix requires lithium source replenishment.

The molten carbonate fuel cell disclosed herein shows improved mechanical strength by reinforcing particles and stabilizes electrolyte composition by solving the problem of lithium depletion occurring in the related art, thereby providing improved cell quality and long-term operatability. The molten carbonate fuel cell may be provided as a single cell or stack.

EXAMPLES

The examples (and experiments) will now be described. The following examples (and experiments) are for illustrative purposes only and not intended to limit the scope of the present disclosure.

Example 1

1-1. Fabrication of Aluminum (Al)-Reinforced Matrix

An aluminum-reinforced matrix is provided as follows. First, a dispersant (DisperBYK-110, BYK Chemie Co.), a binder (polyvinyl butyral, Solutia Co.), a plasticizer (dibutyl phthalate, Junsei Chemical Co.), and an anti-foaming agent (SN D-348, San Nopco, Korea) are introduced into a mixed toluene/ethanol solution, followed by ball milling for 24 hours. Next, a-$LiAlO_2$ (Chemetall Foote Co.; particle diameter 2 μm) and 30 wt % of Al powder (High Purity Chemical Co.; particle diameter 3 μm) are further introduced thereto, followed by milling for 48 hours, thereby providing slurry. Then, the slurry is subjected to tape casting using a doctor blade to provide an aluminum-reinforced matrix green sheet. Finally, a single cell including the matrix is provided.

1-2. Lithium Source Supply—Filling Lithium Hydroxide (LiOH) into Cathode Frame Channel and Supplying the same LiOH is filled into the cathode frame channel of the single cell including the aluminum-reinforced matrix obtained as described above, so that lithium ions are supplied from the frame channel. The method for supplying LiOH is shown in portion (c) of FIG. 1. LiOH has a melting point of 467° C.

Comparative Example 1

Lithium source supply—Adding $Li_2CO_3$ directly into matrix and supplying the same $Li_2CO_3$ is supplied directly into an aluminum-reinforced matrix to supply a lithium source.

The aluminum-reinforced matrix to which $Li_2CO_3$ is added is obtained via a tape casting process as described hereinafter. First, a dispersant (DisperBYK-110, BYK Chemie Co.), a binder (polyvinyl butyral, Solutia Co.), and an anti-foaming agent (SN D-348, San Nopco, Korea) are introduced into a mixed toluene/ethanol solution, followed by ball milling for 24 hours. Next, a-$LiAlO_2$ (Chemetall Foote Co.; particle diameter 2 μm), 30 wt % of Al powder (High Purity Chemical Co.; particle diameter 3 μm) and $Li_2CO_3$ powder are further introduced thereto, followed by milling for 48 hours, thereby providing slurry. Then, the slurry is subjected to tape casting using a doctor blade to provide an aluminum-reinforced matrix green sheet. Finally, a single cell including the matrix is provided.

Comparative Example 2

Lithium source supply—Adding $Li_2CO_3$ lithium source directly to cathode and supplying the same $Li_2CO_3$ is supplied directly into the cathode of a single cell including an aluminum-reinforced matrix to supply a lithium source.

To supply the lithium source, $Li_2CO_3$, by adding the same to the cathode, a cathode to which $Li_2CO_3$ is added is obtained via a tape casting process as described hereinafter. First, a dispersant (DisperBYK-110, BYK Chemie Co.), a binder (polyvinyl butyral, Solutia Co.), and an anti-foaming agent (SN D-348, San Nopco, Korea) are introduced into a mixed toluene/ethanol solution, followed by ball milling for 24 hours. Next, $Li_2CO_3$ powder and nickel powder are further introduced thereto, followed by milling for 48 hours, thereby providing slurry. Then, the slurry is subjected to tape casting using a doctor blade to provide a cathode green sheet including $Li_2CO_3$ added thereto. Finally, a single cell including the matrix is provided.

Test Examples

Test Example 1

Determination of Pore Diameter and Porosity of Single Cell and Measurement of Change in Electrolyte Composition Each single cell according to Example 1 and Comparative Examples 1 and 2 is subjected to measurement of pore diameter, porosity and a change in electrolyte composition. The results of measurement of pore diameter and porosity are shown in the following Table 1.

TABLE 1

Determination of characteristics of pores in reinforced matrix

| Reinforced matrix | Mean value of pore diameter (mm) | | Porosity (%) | |
|---|---|---|---|---|
| | Before cell operation | After cell operation | Before cell operation | After cell operation |
| Comp. Ex. 1 | 0.50 | 0.86 | 47.72 | 82.26 |
| Comp. Ex. 2 | 0.61 | 0.73 | 61.56 | 52.57 |
| Ex. 1 | 0.61 | 0.65 | 61.56 | 61.21 |

As can be seen from Table 1, the pore diameters of Comparative Examples 1 and 2 are increased by about 72% and 20%, respectively, after cell operation. On the contrary, the pore diameter of Example 1 is increased merely by about 6.5%. In other words, the cell of Example 1 shows a significantly decreased change in pore diameter as compared to the pore diameter before cell operation. In terms of porosity, Comparative Example 1 shows an increase of about 72% and Comparative Example 2 shows a drop of about 15%. However, the porosity of Example 1 is increased merely by about 0.6% with little difference from the porosity before cell operation.

In conclusion, it can be seen that the matrix of Example 1 undergoes a significantly smaller change in pores as compared to Comparative Examples 1 and 2, so that the fuel cell of Example 1 maintains stability and is prevented from degradation of quality.

Next, the results of measurement of a change in electrolyte composition are shown in the following Table 2. The measurement is carried out by inductive coupled plasma (ICP) spectrometry, atomic absorption spectrometry (AAS) and American Society for Testing and Materials (ASTM).

TABLE 2

Measurement of change in electrolyte composition

| Reinforced matrix | Element of single cell | Amount of electrolyte before cell operation | Electrolyte loss (vol %) After cell operation | Pore volume in matrix (vol %) After cell operation | Electrolyte ratio (Li/K mol %) | |
|---|---|---|---|---|---|---|
| | | | | | Before cell operation | After cell operation |
| Comp. Ex. 1 | Anode | 20 | 55 | — | 70/30 | 66.74/33.24 |
| | Cathode | 40 | 52 | — | 70/30 | 66.62/33.38 |
| | Matrix | 100 | 90 | 60 | 70/30 | 61.27/38.63 |
| Comp. Ex. 2 | Anode | 20 | 35 | — | 70/30 | 69.26/30.74 |
| | Cathode | 40 | 42 | — | 70/30 | 69.23/30.77 |
| | Matrix | 100 | 55 | 20 | 70/30 | 67.81/32.19 |
| Ex.1 | Anode | 20 | 25 | — | 70/30 | 69.66/30.34 |
| | Cathode | 40 | 27 | — | 70/30 | 69.23/30.77 |
| | Matrix | 100 | 32 | 15 | 70/30 | 69.72/30.28 |

As can be seen from Table 2, Example 1 shows a significantly decreased electrolyte loss (vol %) and provides a significantly lower pore volume (%) in the matrix, as compared to Comparative Examples 1 and 2.

Test Example 2

Test for Performance of Single Cell

Each single cell according to Example 1 and Comparative Examples 1 and 2 is subjected to a performance test. The performance test is carried out in an open circuit with an electric loader (ELTO DC Electronics Co., ESL 300Z) under a current density of 50, 100 and 150 mAcm$^{-2}$.

Figure 2:
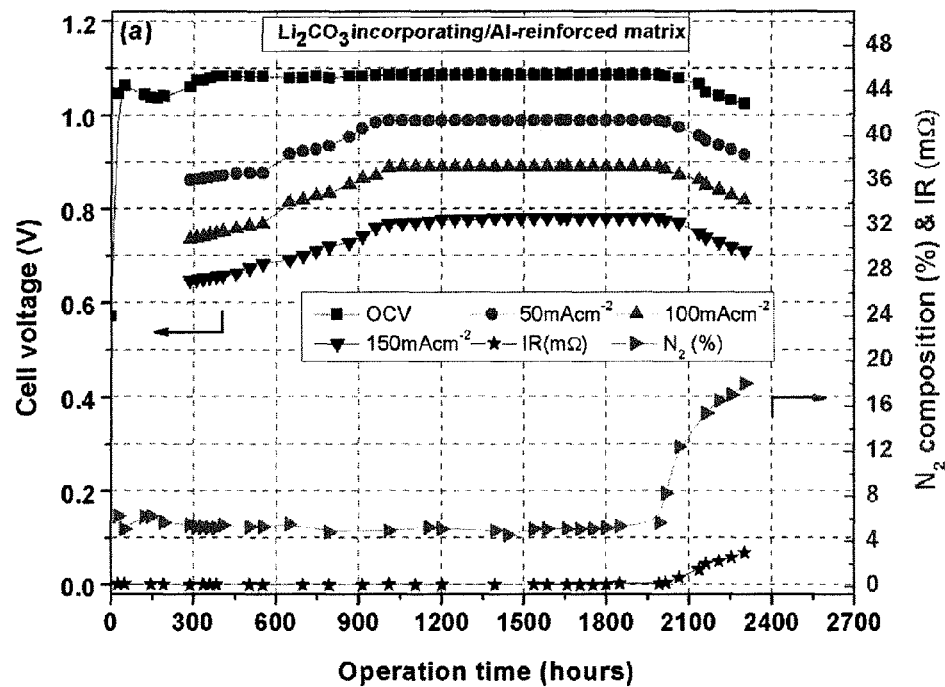
FIGS. 2 to 4 are graphs showing the test results of the quality of the molten carbonate fuel cell according to an embodiment (FIG. 2 corresponds to Comparative Example 1, FIG. 3 corresponds to Comparative Example 2 and FIG. 4 corresponds to Example 1)

In the case of Comparative Example 1 using $Li_2CO_3$ added to the matrix, the test results for the performance of the single cell is shown in FIG. 2. At the initial time of the single cell operation, the single cell shows poor performance. It is thought that this results from a change in electrolyte composition caused by the reaction between $Li_2CO_3$ and aluminum particles. After the cell operates for 1000 hours, it reaches the standard performance. When $Li_2CO_3$ is added to the matrix, the cell shows stable performance of 0.78 V under a current density of 150 mA/cm$^2$ by the time of 2000 hours of operation. In other words, by the time of 2000 hours of operation, $N_2$ cross-over does not occur substantially even if $Li_2CO_3$ reacts with aluminum to produce another material in a different phase. However, after 2302 hours or more, it is shown that the single cell undergoes rapid degradation of performance. It is thought that this results from the generation of pores at the sites of $Li_2CO_3$ particles, leading to a rapid increase in internal resistance (IR) and $N_2$ cross-over. In other words, addition of $Li_2CO_3$ into the matrix causes collapse of ion conductive paths of the electrolyte. Although $Li_2CO_3$ reacts with aluminum particles to produce $LiAlO_2$ in a different phase, the pores generated by $Li_2CO_3$ adversely affect conduction of carbonate ions. Moreover, addition of $Li_2CO_3$ into the matrix causes a change in electrolyte composition, resulting in an increase in IR.

Figure 3:
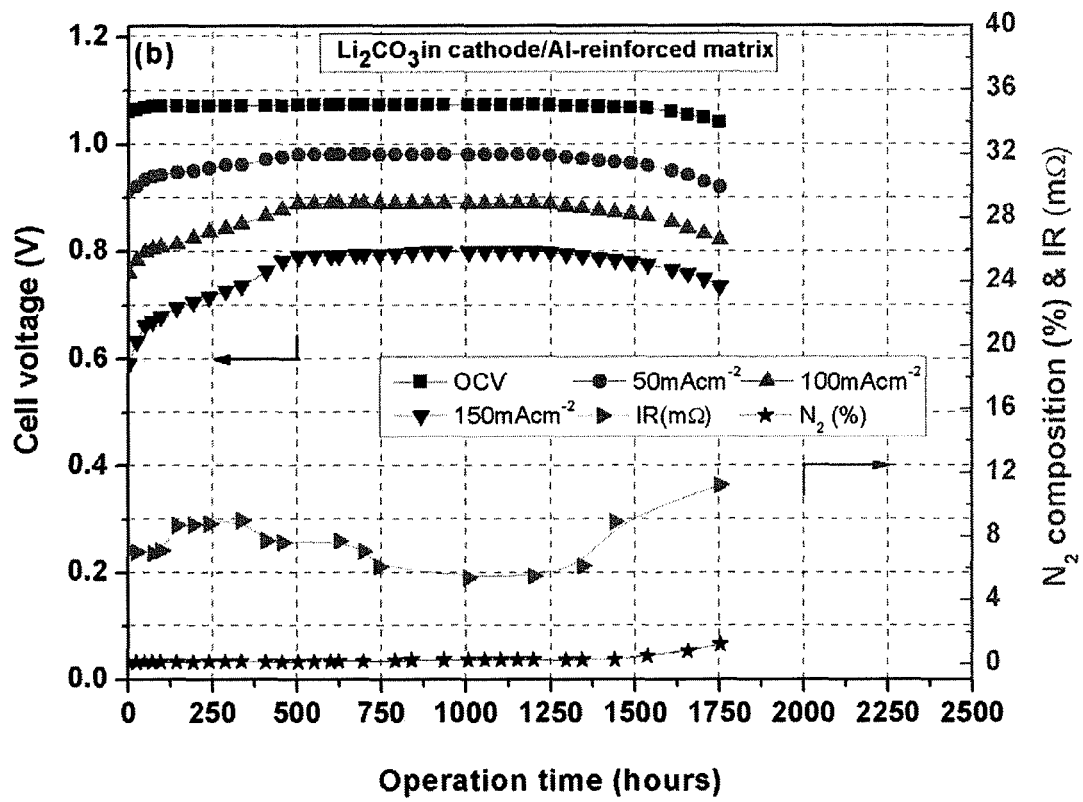

In the case of Comparative Example 2 using $Li_2CO_3$ added to the cathode, the test results for the performance of the single cell is shown in FIG. 3. After the single cell is operated for 300 hours, the single cell undergoes improvement in performance. During the first 300 hours of operation, a variation in cell performance is observed. It is thought that this results from a lithiation process, leading to a change in surface structure of the cathode, in addition to the reaction between aluminum particles in the reinforced matrix and the lithium source. When the cell performance is stabilized, the cell reaches 0.79 V. The cell shows stable performance and IR by the time of 1200 hours of operation, undergoes a rapid increase in IR after 1500 hours, and then shows degradation of cell performance. It is thought that this results from the fact that lithium deficiency occurs in the electrolyte, because $Li_2CO_3$ has a high melting point so that the lithium source may not be molten easily from the cathode into the electrolyte. Due to such lithium deficiency, the cell performance is degraded, and IR and $N_2$ cross-over are increased.

Figure 4:
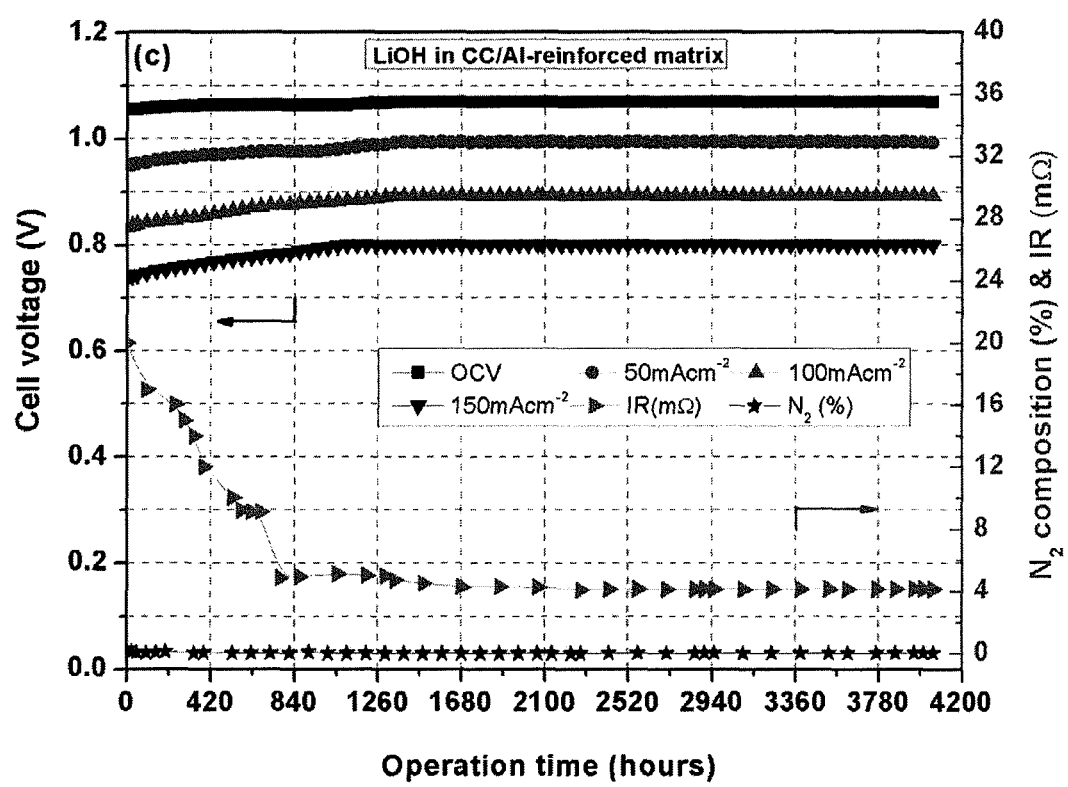

In the case of Example 1 using LiOH supplied to a cell frame channel, the test results for the performance of the single cell is shown in FIG. 4. The single cell shows initial performance similar to that of the single cell using $Li_2CO_3$ added to the cathode. After 300 hours of operation, the cell reaches 0.80 V under a current density of 150 mA/cm$^2$. The cell maintains stable performance by the time of 4060 hours of operation. The cell shows a significantly high initial IR, which may results from a lithiation process. Such a lithiation process is caused by the initial chemical reaction between lithium in the electrolyte and aluminum in the matrix, and thus has no effect upon the cell performance. As the single cell starts stable operation after supplying LiOH into the matrix, IR is lowered as compared to Comparative Examples 1 and 2.

Such a variation in cell performance occurring during the initial operation of 300 hours is caused by the lithiation process leading to a change in surface structure of the cathode, in addition to the reaction between aluminum particles in the reinforced matrix and the lithium source. Therefore, during that time, redistribution of the electrolyte composition is made. This suggests that $LiAlO_2$ is produced from the reaction between lithium ions and aluminum particles through the long-term operation stability, thereby maintaining high mechanical strength. This also suggests that the lithium source having a low melting point is conducted well to the electrolyte through the pores without breaking the structure of the cathode.

Meanwhile, Comparative Examples 1 and 2 show similar behaviors in terms of degradation of the performance of the single cell. However, Example 1 using LiOH added to the cathode frame channel improves electrolyte wettability by forming a new $LiAlO_2$ phase from LiOH in the reinforced matrix. Therefore, it can be seen that addition of LiOH having a low melting point is effective for improvement of the life of an aluminum-reinforced matrix.

Test Example 3

Differential Pressure Test for Single Cell

Figure 5:
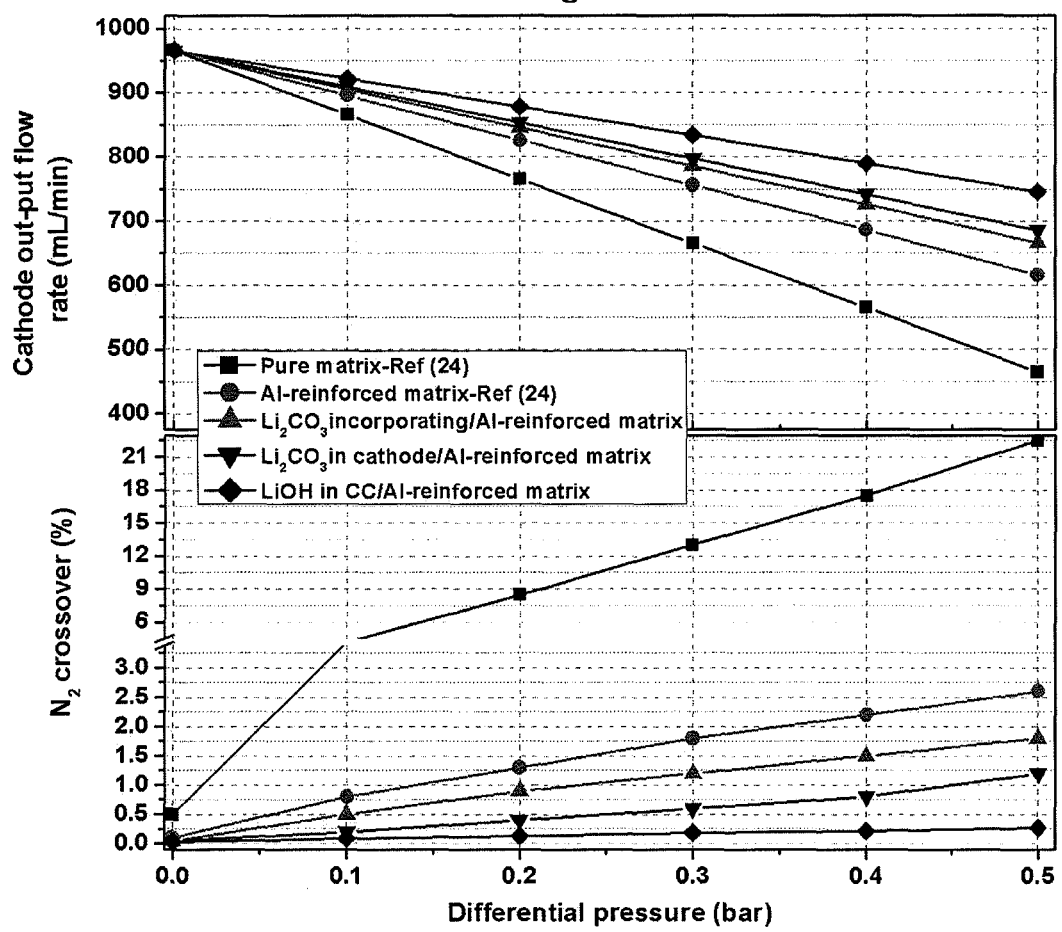
FIG. 5 is a graph showing the results of the differential pressure test of a molten carbonate fuel cell according to an embodiment.

Each single cell according to Example 1, Comparative Example 1 and Comparative Example 2 is subjected to a test for differential pressure. The test for differential pressure is carried out by varying the pressure between the cathode and an anode in a range of 0-0.5 bar and measuring the amount of $N_2$ cross-over at the anode and the cathode output flow rate. The amount of $N_2$ cross-over represents the degree of cracking in the matrix and is measured by gas chromatography (Hewlett-Packard 5890 series II, USA). The results are shown in FIG. 5. As references for comparison, a non-reinforced matrix (Pure matrix-Ref) and a conventional aluminum-reinforced matrix (Al-reinforced matrix-Ref) are used.

Referring to the cathode output flow rate, Comparative Example 2 and Example 1 show a gradient of 60 and 44 ccm/0.1 bar, respectively, as can be seen from FIG. 5. The gradient corresponds to the amount of cathode gas leakage through the cracks in the matrix or wet-seal areas. Thus, it can be seen that the amount of cathode gas leakage is lower in Example 1.

Referring to $N_2$ cross-over, Comparative Example 1 shows a rapid increase in $N_2$ cross-over as the differential pressure increases (0.05→1.8%). On the contrary, Example 1 shows a significantly decreased increment of $N_2$ cross-over (0.03→0.27%). This suggests that the non-reinforced matrix and the conventional Al-reinforced matrix (references) or the reinforced matrix including $Li_2CO_3$ added to the matrix (Comparative Example 1) cause cracking, resulting in a severe $N_2$ cross-over even with a small differential pressure. Meanwhile, it can be seen that when adding LiOH to the cathode frame channel (Example 1), no cracking occurs and the matrix is reinforced satisfactorily. Thus, the single cell of Example 1 is amenable to long-term operation for 4,000 hours or more.

Test Example 4

Thermal Cycle Test of Single Cell

Figure 6:
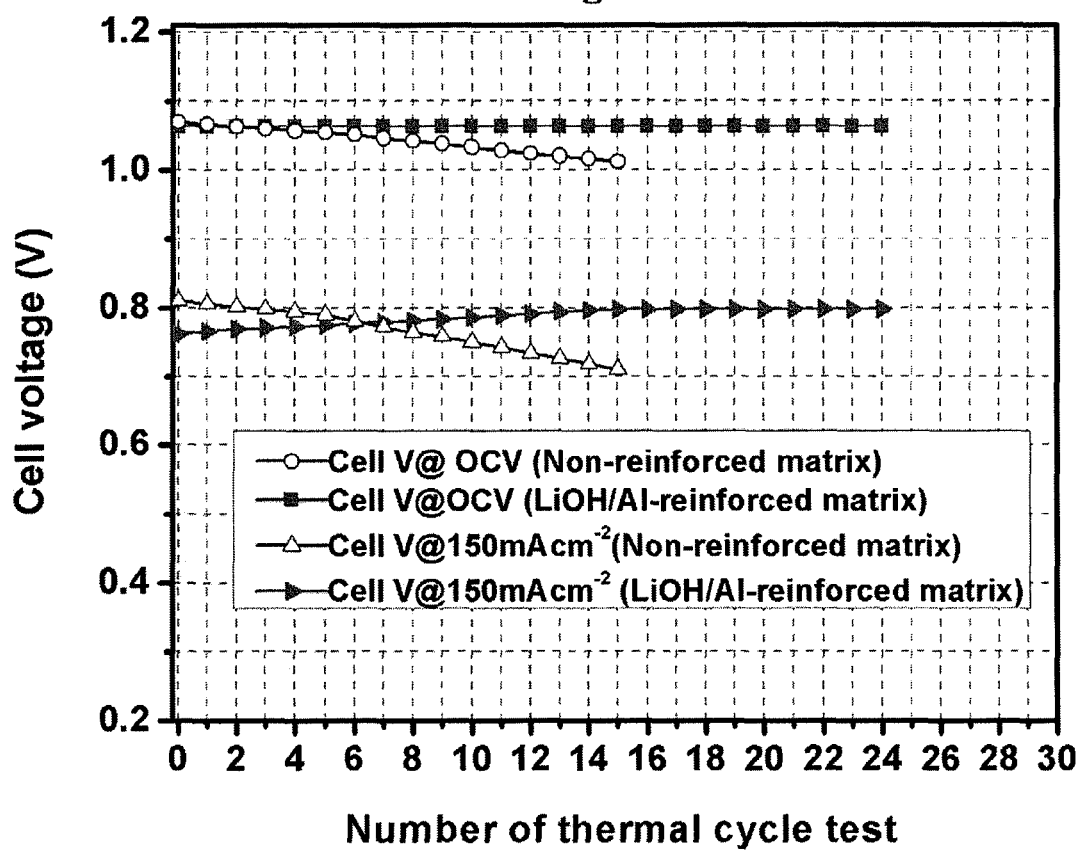
FIG. 6 is a graph showing the test results of performance of a single cell in a thermal cycle test of a molten carbonate fuel cell according to an embodiment.
Figure 7:
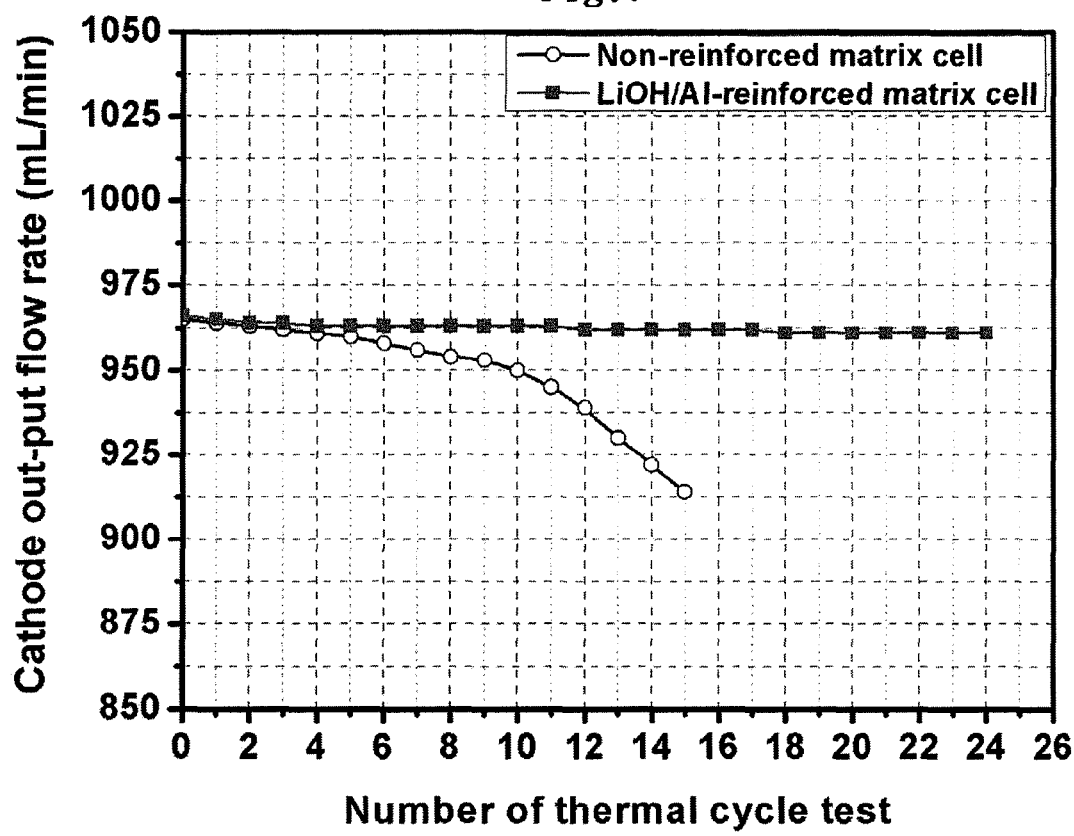
FIG. 7 is a graph showing the output gas flow rate in a cathode in a thermal cycle test of a molten carbonate fuel cell according to an embodiment.

Each single cell according to Example 1, Comparative Example 1 and Comparative Example 2 is subjected to a thermal cycle test. The results of variations in performance of each cell during the thermal cycle test are shown in FIG. 6. During the thermal cycle test, matrix stability may be determined by measuring the cathode output flow rate, $N_2$ cross-over and an IR change. FIG. 7, FIG. 8 and FIG. 9 illustrate the results of each parameter. As references for comparison, a single cell using a non-reinforced matrix and another single cell using a conventional aluminum-reinforced matrix are used.

As can be seen from FIG. 6, the single cell having a non-reinforced matrix shows an initial open circuit voltage (OCV) of 1.069 V and an OCV of 0.83 V under a current density of 150 mA/cm$^2$. However, after 15 thermal cycles, OCV is 1.021 V and rapidly decreases to 0.718V under a current density of 150 mA/cm$^2$. Similarly, $N_2$ cross-over rapidly increases (see, FIG. 8), suggesting that cracking occurs in the matrix due to the 15 thermal cycles. On the contrary, the single cell using an Al-reinforced matrix to which LiOH is supplied (Example 1) shows significantly improved resistance against thermal cycles. The single cell using an Al-reinforced matrix to which LiOH is supplied shows an initial OCV of 1.063V and an OCV of 0.765V under a current density of 150 mA/cm$^2$. Moreover, the single cell of Example 1 shows little change in performance even after 24 thermal cycles. This suggests that the Al-reinforced matrix to which LiOH is supplied as a lithium source has significantly improved mechanical strength.

As can be seen from FIG. 8, the single cell using a non-reinforced matrix shows a rapid drop in cathode output flow rate and increased $N_2$ cross-over, as the thermal cycle test is repeated. This suggests that cracking occurs in the matrix. However, the single cell using an Al-reinforced matrix to which LiOH is supplied (Example 1) shows little change in cathode output flow rate even after 24 thermal cycles. In addition, the single cell of Example 1 shows a small increase in $N_2$ cross-over. This suggests that the Al-reinforced matrix to which LiOH is supplied has high performance as a reinforced matrix.

Further, IR is measured to determine whether cracking occurs in the matrix during the thermal cycle test or not. The test results are shown in FIG. 9. In general, it is known that cracking in the matrix causes a rapid increase in IR. As can be seen from FIG. 9, the single cell using a non-reinforced matrix maintains IR during the initial thermal cycle, but shows a rapid increase in IR after 15 thermal cycles. Such results coincide with the above-described results of the measurement of cathode output flow rate and $N_2$ cross-over. However, the single cell using an Al-reinforced matrix to which LiOH is supplied (Example 1) shows no rapid increase in IR even after 24 thermal cycles.

As can be seen from the foregoing, a non-reinforced matrix having low mechanical strength causes cracking in the matrix after the thermal cycle test, while the Al-reinforced matrix to which LiOH is supplied shows excellent mechanical strength, and thus causes no cracking in the matrix even after the thermal cycle test.

The molten carbonate fuel cell including a reinforced lithium aluminate matrix disclosed herein minimizes an increase in IR, reactant gas cross-over and cracking, thereby providing high mechanical strength, excellent performance and long-term operatability.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A molten carbonate fuel cell comprising a reinforced lithium aluminate matrix, an electrolyte supported by the matrix and having a melting point, a cathode, an anode, a cathode frame channel and an anode frame channel, wherein at least one of the cathode frame channel and the anode frame channel is filled with a lithium source having a melting point lower than that of the electrolyte, wherein the reinforced lithium aluminate matrix is reinforced with aluminum particles incorporated thereto, and wherein the aluminum particles of the matrix are surrounded by a lithium compound from the lithium source.

2. The molten carbonate fuel cell according to claim 1, wherein the lithium source has a melting point of 200 to 500° C.

3. The molten carbonate fuel cell according to claim 1, wherein the lithium source comprises at least one selected from the group consisting of lithium hydroxide (LiOH), lithium nitrate (LiNO3) and lithium iodide (Li1).

4. A method for producing a molten carbonate fuel cell comprising a reinforced lithium aluminate matrix, an electrolyte supported by the matrix and having a melting point, a cathode, an anode, a cathode frame channel and an anode frame channel, comprising:
reinforcing the lithium aluminate matrix with aluminum particles incorporated thereto, and
supplying a lithium source having a melting point lower than that of the electrolyte to at least one of the cathode frame channel and the anode frame channel, and wherein aluminum particles of the matrix are surrounded by a lithium compound from the lithium source.

5. The method for producing a molten carbonate fuel cell according to claim 4, wherein the lithium source has a melting point of 200 to 500° C.

6. The method for producing a molten carbonate fuel cell according to claim 4, wherein the lithium source comprises at least one selected from the group consisting of lithium hydroxide (LiOH), lithium nitrate (LiNO3) and lithium iodide (Li1).

7. A method for supplying a lithium source to a molten carbonate fuel cell comprising a lithium aluminate matrix reinforced with aluminum particles, a cathode, an anode, a cathode frame channel and an anode frame channel comprising:
supplying a lithium source to at least one of the cathode frame channel and the anode frame channel to allow the lithium source to reach the matrix such that the aluminum particles are surrounded by a lithium compound from the lithium source.

* * * * *